April 30, 1968   J. D. WILLIS   3,380,396
VEHICLE CONVEYING MEANS
Filed Dec. 28, 1965   2 Sheets-Sheet 2
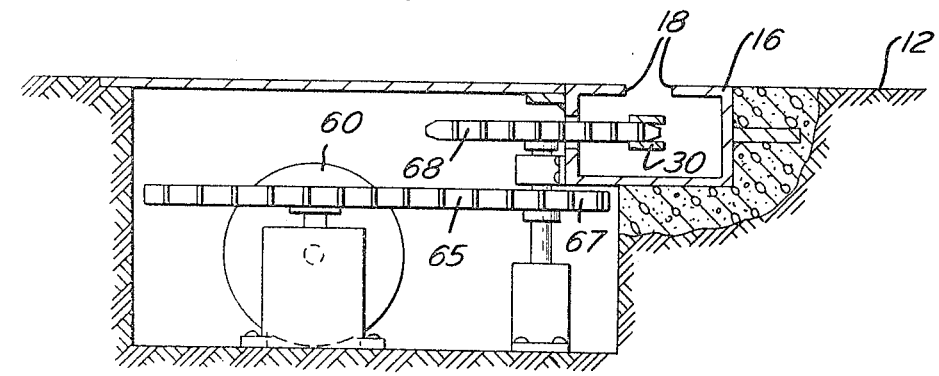
FIG. 4
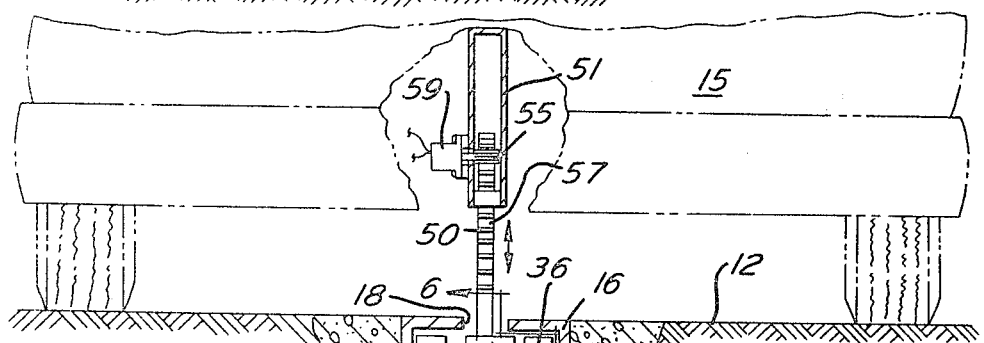
FIG. 5
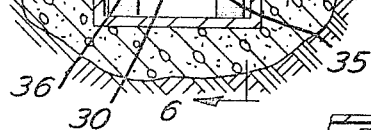
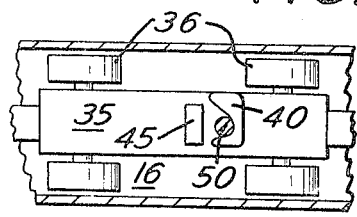
FIG. 7
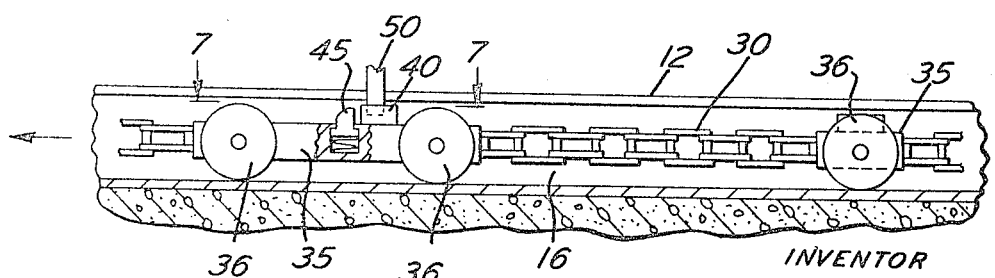
FIG. 6
INVENTOR
JOHN D. WILLIS
BY Jacob Trachtman
ATTORNEY

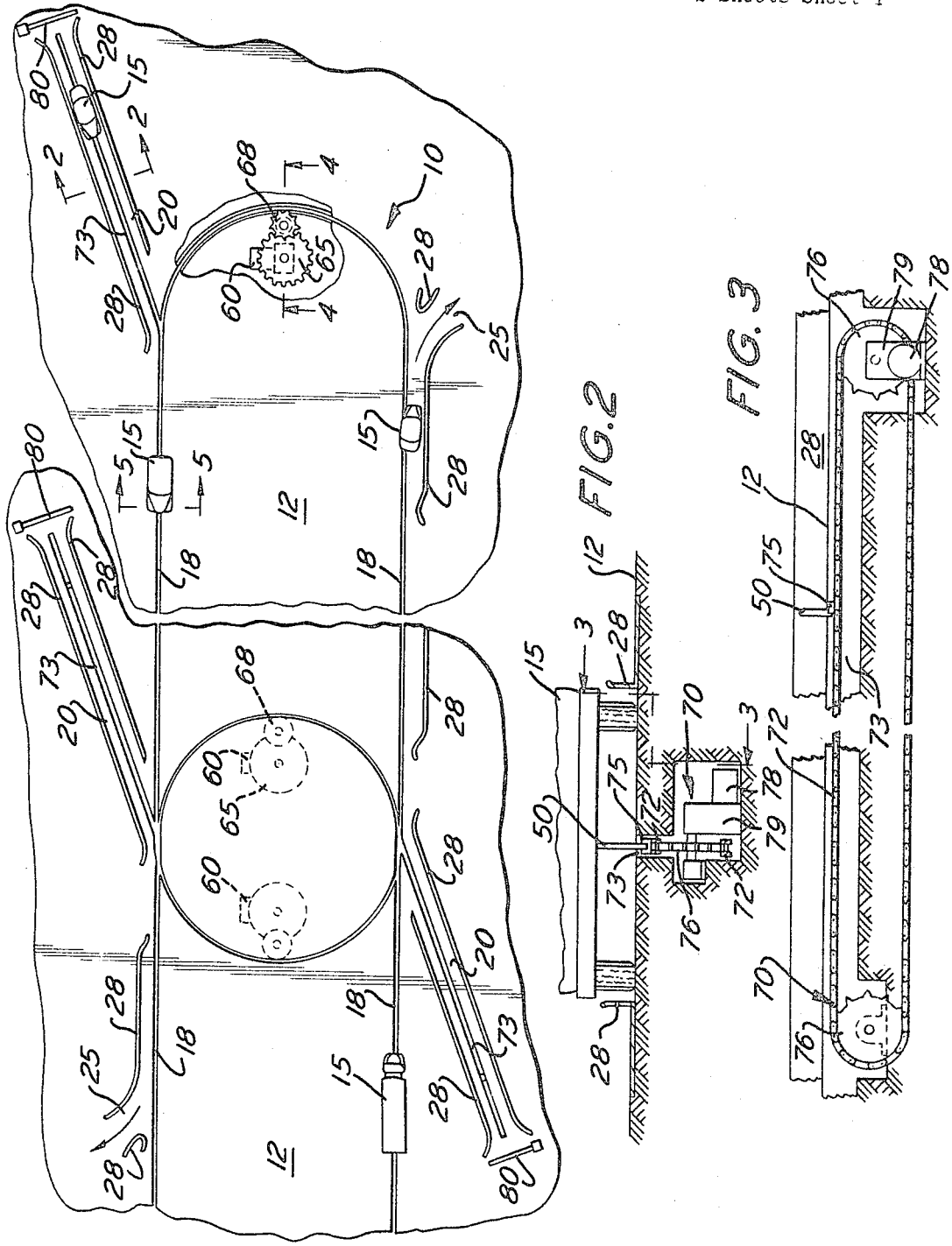

United States Patent Office 3,380,396
Patented Apr. 30, 1968

3,380,396
VEHICLE CONVEYING MEANS
John D. Willis, 2024 W. Venango St.,
Philadelphia, Pa. 19140
Filed Dec. 28, 1965, Ser. No. 516,965
9 Claims. (Cl. 104—172)

ABSTRACT OF THE DISCLOSURE

Machinery for high speed transportation of motor vehicles between distant points, comprising a roadway having a surface communicating between said distant points, a continuous conveyor forming an elongated loop with sides thereof parallel to said roadway, means supporting said conveyor for travel thereof at high speed with respect to said roadway, means to drive said conveyor at a high rate of constant speed, coupling means, spaced at desired intervals along said conveyor, for engagement with individual of said motor vehicles, pulling said vehicles therewith along said surface at high speed, to thereby transport them between said distant points, and entrance ways including means for accelerating said motor vehicles to said high rate of constant speed of said conveyor for a smooth engagement between said coupling means and said motor vehicles.

---

This invention relates, in general, to motor vehicle traffic, and in particular, to a highspeed conveyor for the transportation of motor vehicles between distant points.

The enormous proliferation of motor vehicles during the recent past has also produced corresponding problems of traffic congestion and control. The so-called super highways and expressways are no sooner completed than they become inadequate and obsolete. Heavy traffic flow on the present day roadways is easily interrupted, slowed and even stopped completely, much to the daily consternation of millions of drivers, by the mismanagement of a few, or merely a single motor vehicle traveling thereon. In addition, the incomplete burning of hydrocarbon fuels in the engines of the motor vehicles, which are concentrated in large numbers, at peak rush hours, daily, particularly in or near great population centers, is causing serious air pollution hazards. These problems must be eliminated in order to provide convenient and comfortable travel by motor vehicles on the roadways of the future.

It is proposed by the invention disclosed herein, that the present and future superhighways and expressways be replaced by giant conveyor systems for the transportation in mass of a large number of motor vehicles, to and from and between the population centers. Motive power of the individual vehicles and the individual driver attention to manage and direct each vehicle will be required only to get on and off the conveyor, thus vehicle engines may be turned off and the drivers may relax during a considerable leg of the journey. In this manner, the invention herein will provide high speed motor vehicle transportation that is controlled, orderly, comfortable and fume-free.

Therefore, to overcome the foregoing and other difficulties of the prior art, the general object of this invention is to provide a new and better means for the transportation of motor vehicles between distant points.

It is an object of this invention to alleviate air pollution caused by motor vehicles and at the same time promote safe highspeed travel by motor vehicle which is orderly and comfortable.

Another object of this invention is to provide a giant conveyor system for the highspeed transportation of motor vehicles thereon between distant points in orderly, controlled fashion.

A further object of this invention is the provision of a giant conveyor which may be utilized in conjunction with present day motor vehicles for transportation thereof, requiring a minimal modification of the vehicles.

It is an object of this invention to provide a giant conveyor traveling at a high rate of constant speed, which has means to accelerate motor vehicles coming onto it to the same high rate of speed for a smooth transition of the vehicles therealong.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description and claims taken in conjunction with the accompanying drawings in which:

FIGURE 1 is a partial plan view showing portions of the invented conveyor system, FIGURE 2 is an enlarged cross-sectional view taken along line 2—2 of FIGURE 1, FIGURE 3 is a cross-section of FIGURE 2 taken along the lines 3—3, FIGURE 4 is an enlarged cross-sectional view taken along line 4—4 of FIGURE 1, FIGURE 5 is another enlarged cross-sectional view of FIGURE 1 taken along lines 5—5, FIGURE 6 is a cross-section of FIGURE 5 taken along the lines 6—6, and FIGURE 7 is a plan view of a portion of FIGURE 6 in the direction of the arrows 7—7.

Referring to the drawings in detail, wherein like numerals indicate like elements, there is shown in FIGURE 1 a representation of the giant conveyor apparatus of the present invention designated generally at 10. A roadway is provided having a surface 12 for the travel therealong of motor vehicles 15 between distant points, such as the various population centers, or the like. As may be best visualized with reference to FIGURES 4 and 5, the roadway has a guide channel 16 running, at both sides thereof, beneath the surface 12. The channel 16 is continuous, forming an elongated loop beneath the surface 12. It is naturally understood, that the channel 16 may be placed, during construction, in the roadway material, such as concrete or macadam, as a permanent part of the roadway. A slot 18 provides an opening communicating between the channel 16 and the roadway surface 12, as shown. With reference to FIGURE 1, the slot 18 indicates the loop therebelow of channel 16 and also defines opposite travel lanes on the roadway surface 12, in accordance to the directions of the vehicles 15 thereon. The roadway also includes the entrance ways 20 and the exit turn-offs 25, thereby providing egress and exit for the vehicles 15. Naturally, the various entrance ways 20 and exit turn-offs 25 must be properly oriented with respect to the respective travel lane directions, as illustrated, and also be marked adequately, which may be satisfactorily accomplished by means of the bumper guides 28, A conveyor 30 is provided by the flexible chain disclosed in FIGURE 7. The conveyor 30 is continuous, running beneath surface 12 in the channel 16, following the contour of the elongated loop formed by the channel. Notice that the above-mentioned elongated loop has sides parallel to the roadway, one side at each travel lane. Naturally, a single giant loop may prove to be impractical and cumbersome over too great a span of distance. Therefore, this invention proposes to span great distances by linking a series of elongated loops, having a more manageable length, of say 10 miles. As shown, in FIGURE 1, the various adjacent loops formed by channels 16, are linked at their semi-circular end portions. The side portions of each adjacent loop are in alignment with one side of one loop passing under an aligned side of the other loop, and the remaining side of the one loop passing over the remaining side of the other loop, respectively. However, of course, both sides of each loop may pass under or over, as desired, the sides of an adjacent loop.

Support means for travel and guidance of the conveyor 30 within the channel 16 is provided by the trucks 35. The trucks 35 have wheels 36 of an accommodating size adapted for travel and guidance within the channel 16. As illustrated in FIGURE 7, the various trucks 35 carry the conveyor 30 at spaced intervals therealong.

A means for coupling the vehicles 15 to the conveyor 30 is provided by the slotted plate 40 carried on certain of the trucks 35. The slot of plate 40 forms a hook or catch for engagement with a retractable means, such as rod 50, projecting downward from a motor vehicle 15. The spring biased stopper 45 locks the engagement, preventing the vehicle from accelerating ahead of its respective coupling means. Disengagement may be accomplished only by retracting the rod 50 upward. Now it is contemplated by this invention, that each motor vehicle 15 will carry a retractable assembly 51, attached preferably at a front frame member and at the central axis of the vehicle. Each retractable assembly 51, includes a conventional pinion 55 driven by motor 59 and rack 57 on the rod 50. Thus, the rod 50 may be displaced downward for engagement with the catch of plate 40, or retracted upward therefrom, by energizing the motor 59, whenever so desired by a driver of vehicle 15.

Means to drive the conveyor 30 at a constant rate of high speed are provided by individual synchronous motors 60 which drive reduction gears 65, 67 and the drive sprockets 68. As shown in FIGURE 1, a drive motor 60 may be provided at each end of each individual loop of the series forming the continuous conveyor 30. The various motors 60 are all synchronized and the coupling means of each loop are spaced, so that each loop is driven at the same high rate of speed with a smooth transition of motor vehicles 15 therebetween.

Now it may be difficult for a motor vehicle to attain the high speed requisite to a smooth engagement with the coupling means carried on the conveyor 30. Therefore, it is also proposed that each of the entrance ways 20 include a means for accelerating the vehicles 15 to the proper speed. This is accomplished by means of a secondary conveyor 72, which is the continuous chain shown in FIGURE 3. The conveyor 72 is contained in a slot 73 beneath the roadway surface 12. The slot 73 runs up the center line of the entrance way 20 to a tangent point in the slot 18, as may be visualized with reference to FIGURE 1. A coupling catch 75 is carried by the conveyor 72 for engagement with a retractable rod 50 of a vehicle 15. The secondary conveyor 72 is dirven by motor 78 and reduction gears 79 which turn the secondary drive sprockets 76. It is understood that the secondary conveyor is driven at varied speeds, from a stop to the high rate of speed of the conveyor 30, in order to accelerate the motor vehicles 15 for engagement therewith. Operation of the secondary conveyor 72 may be initiated by switch 80, which senses the presence of a vehicle 15 on the entrance way 20.

Thus operation of the invented giant conveyor apparatus 10 may be initiated by merely driving a vehicle 15 onto the entrance way 20. The driver positions the vehicle 15 between the guide bumpers 28 and then energizes the motor 59 of the retractable assembly 51 to extend the rod 50 downward into engagement with the coupling catch 75 on the secondary conveyor 72. A delayed signal from the switch 80 energizes the secondary drive motor 78, which accelerates the conveyor 72 and vehicle 15 thereon to the high speed of the conveyor 30. The vehicle, now traveling at the same rate of speed as the conveyor 30 beneath it, can be smoothly coupled thereto by engagement between the retractable rod 50 and a coupling plate 40 of the conveyor 30. The engine of the vehicle may be turned off and the driver may relax, since travel of the vehicle 15 along the roadway will be driven and guided by the conveyor 30. Upon reaching a destination, all that need be done is to retract the rod 50 from engagement with the conveyor 30 and direct the vehicle off one of the exit turn-offs 25.

The present invention may be embodied in other specific forms without departing from the spirit or essential attributes thereof and, accordingly reference should be made to the appended claims, rather than to the foregoing specification as indicating the scope of the invention.

What is claimed is:

1. Machinery for high speed transportation of motor vehicles between distant points, comprising: a roadway having a surface communicating between said distant points; a continuous conveyor forming an elongated loop with sides thereof parallel to said roadway; means supporting said conveyor for travel thereof at high speed with respect to said roadway; means to drive said conveyor at a high rate of constant speed; coupling means, spaced at desired intervals along said conveyor, for engagement with individual of said motor vehicles, pulling said vehicles therewith along said surface at high speed, to thereby transport them between said distant points; and entrance ways including means for accelerating said motor vehicles to said high rate of constant speed of said conveyor for a smooth engagement between said coupling means and said motor vehicles.

2. Machinery in accordance with claim 1 wherein said roadway is divided to define opposite travel lanes and includes entrance ways and exit turn-offs oriented to lead traffic flow of said motor vehicles on and off said roadway in accordance to traffic flow directions established by said lanes, and said sides of said loop of said conveyor being separated, one side at each of said lanes for opposite travel therealong, with respect to each other, of said sides in accordance with said traffic flow directions established on said roadway.

3. Machinery in accordance with claim 2 wherein said conveyor includes a plurality of individual elongated loops linked end to end and providing a continuous length for said conveyor for travel in the direction along said lanes between distant points with terminations thereof at said distant points, and said means to drive said conveyor at said high rate of constant speed including a plurality of drive means, at least one for each of said individual loops, said plurality of drive means being synchronous to drive all said loops at the same rate of constant speed allowing a smooth transition of said motor vehicles along said conveyor.

4. Machinery in accordance with claim 3 wherein each of said motor vehicles has a retractable means for engagement with said coupling means of said conveyor, said retractable means being disengaged at will from said coupling means by a retraction thereof allowing said vehicles to leave said roadway at desired of said exit turn-offs as chosen.

5. Machinery in accordance with claim 3 wherein adjacent ones of said individual elongated loops have sides in alignment and have ends linked by passing a side of one loop under a side of the other loop and the remaining side of said one loop over the remaining side of said other loop, respectively, said adjacent ones of said loops each having coupling means thereon spaced and synchronized with respect to each other for a smooth transition of a motor vehicle therebetween.

6. Machinery in accordance with claim 1 wherein said roadway has a guide channel therealong beneath said surface and includes a slot communicating between said channel and surface, said conveyor being a continuous chain within said channel, and said means supporting said conveyor being a plurality of trucks carrying said chain at spaced intervals therealong, said trucks being adapted for high speed travel and guidance within said channels.

7. Machinery in accordance with claim 7 wherein each of said trucks carries a coupling means which is a slotted plate forming a coupling catch thereon.

8. Machinery in accordance with claim 7 wherein each of said motor vehicles has a retractable rod which may be extended downward through said slot into engagement with said coupling catch of one of said trucks.

9. Machinery in accordance with claim 1 wherein said means for accelerating said vehicles includes a secondary continuous conveyor chain forming an elongated loop contained and supported in a slot beneath said entrance way with one side of said chain proximate the surface and parallel to said entrance way, said slot extending along said entrance way to a tangent point with the first said conveyor, coupling means carried by said chain for engagement with a vehicle which is to be accelerated and conveyed by said machinery, and means driving said secondary conveyor chain at varied speeds from a stop to the high rate of speed of the first said conveyor in order to accelerate the motor vehicle for engagement with the first said conveyor, and means for sensing the presence of a vehicle on said entrance way for initiating the operation of said means driving said secondary conveyor.

References Cited

UNITED STATES PATENTS

| | | | |
|---|---|---|---|
| 1,065,470 | 6/1913 | Roed | 104—172 |
| 1,787,763 | 1/1931 | Rosebrook | 104—172 |
| 1,827,886 | 10/1931 | Gillespie | 104—44 |
| 3,077,164 | 2/1963 | De Roza | 104—172 |
| 3,126,838 | 3/1964 | Bradt | 104—172 |

EUGENE G. BOTZ, *Primary Examiner.*

ARTHUR L. LA POINT, *Examiner.*

D. F. WORTH, *Assistant Examiner.*